United States Patent
Ripoyla et al.

(10) Patent No.: US 6,508,389 B1
(45) Date of Patent: Jan. 21, 2003

(54) HARNESS SYSTEM FOR LIFTING OBJECTS

(76) Inventors: Robert K. Ripoyla, 2421 Vail Ave., Stockton, CA (US) 95205; Larry D. Garman, 1103 N. Argonaut, Stockton, CA (US) 95203

( * ) Notice: Subject to any disclaimer, the term of this patent is extended or adjusted under 35 U.S.C. 154(b) by 1 day.

(21) Appl. No.: 09/710,084

(22) Filed: Nov. 9, 2000

Related U.S. Application Data
(60) Provisional application No. 60/164,922, filed on Nov. 15, 1999.

(51) Int. Cl.[7] .................................................. A61G 5/00
(52) U.S. Cl. ........................ 224/157; 224/260; 224/262; 182/3
(58) Field of Search ................................ 224/157, 158, 224/160, 259, 260, 262, 266, 606; 182/3; 294/140

(56) References Cited

U.S. PATENT DOCUMENTS

| | | | |
|---|---|---|---|
| 620,694 A | * | 3/1899 | Chadwick |
| 1,096,489 A | * | 5/1914 | Chadwick |
| 2,431,780 A | * | 12/1947 | Theal |
| 3,181,752 A | | 5/1965 | Seltzer |
| 3,258,788 A | * | 7/1966 | Anciaux |
| 3,486,671 A | * | 12/1969 | Sanders |
| 4,280,645 A | | 7/1981 | Goodden |
| 4,739,526 A | | 4/1988 | Hollick |
| 5,009,349 A | * | 4/1991 | Eide et al. |
| 5,184,764 A | * | 2/1993 | Orovan et al. |
| 5,503,448 A | | 4/1996 | Dewey |
| 5,688,011 A | | 11/1997 | Gulley |
| 6,039,376 A | | 3/2000 | Lopreiato |

* cited by examiner

Primary Examiner—Stephen K. Cronin
(74) Attorney, Agent, or Firm—Heisler & Associates (57) ABSTRACT

A harness lifting system 10 is provided for team lifting of objects 10. Two harnesses 12, 14 are provided which are worn separately by two users 32. The system 10 includes two support lines or straps 16, 18. Each line 16, 18 has coupling points spaced from each other which removably attach to one of the harnesses 12, 14. The lines 16, 18 preferably link together at cross-over point 26 and then extend back to the same harness 12, 14 that the line 16, 18 first extends from the system 10 includes adjustability providing structures and accessories for optimal use to enhance the basic system 10.

11 Claims, 6 Drawing Sheets

HARNESS SYSTEM FOR LIFTING OBJECTS

This application claims benefit under Title 35, United States Code §119(e) of United States Provisional Application No. 60/164,922 filed on Nov. 15, 1999.

FIELD OF THE INVENTION

This invention pertains generally to devices for lifting heavy or bulky objects and more specifically to a harness system for team lifting of heavy or bulky objects.

BACKGROUND OF THE INVENTION

Lifting harnesses have been in existence for purposes of lifting a variety of heavy loads. Most of these harness systems have been made for a single user in carrying heavy and/or bulky loads. For example, U.S. Pat. No. 3,181,752 issued to A. P. Seltzer on May 4, 1956, discloses a harness system worn by a single user and adapted for carrying luggage. In this patent, the harness straps around the upper body of the user and a pair of hanging straps extend downward. The hanging straps couple to luggage handles and the user then walks in a normal manner, bearing the weight of the luggage upon the harness, rather than carrying the luggage with the arms i a normal manner. This invention thereby alleviates the fatigue associated with carrying heavy luggage long distances.

U.S. Pat. No. 4,280,645 issued to Goodden on Jul. 28, 1981, discloses a harness system for lifting heavy objects, such as large furniture pieces. This device was basically comprised of a yoke-type harness having two L-shaped support members depending downward. The L-shaped members couple around a user's arms and terminate at their bottoms in a platform having a frictional covering on their upper surface. The objective for the wearer of this device was to slide the platforms beneath a lifting surface on a large object. For example, the platforms could slide beneath the edge of a large table and be used to lift the table. A drawback of this device was that large objects could easily slip off the platforms while the wearer was in an awkward position, thereby damaging the object being carried, or injuring the wearer. Also, the L-shaped members are difficult to adjust in length, thereby requiring a wearer to stoop or bend uncomfortably low to bring the pads in contact with a lifting surface.

In many situations involving heavy lifting, a two person team is used. The use of two people to lift large objects has the advantage of using the muscle power of another individual, thereby allowing more weight and heavier objects to be borne. The prior art harness lifting systems have not yet embraced this team concept by providing a harness system which can be used by a two-person (or greater) team.

Additionally, the prior art has not provided a harness lifting system which does not require extensive bending and stooping to put the lifting surfaces of a harness system in contact with a large or bulky object. Such bending or stooping can increase the chance of injury to a lifter because the lifter is often forced to lift an object from an awkward or unnatural position.

Therefore, a need exists for a harness lifting system which can be used to lift large bulky objects without extensive bending or stooping. Additionally, a need exists for a harness system which can be adapted for use by two or more individuals so that the lifting power of a team of lifters can be exploited.

The foregoing discussion reflects the state of the art of which the inventor is aware, and is tendered with a view toward discharging the inventor's acknowledged duty of candor in disclosing information which may be pertinent with regards to the patentability of the present invention. It is respectfully stipulated, however, that the disclosed information does not teach or render obvious, singly or when considered in combination, the inventor's claimed invention.

SUMMARY OF THE INVENTION

This invention pertains to a harness system for lifting large and/or bulky objects.

In a first embodiment, this harness system is worn by two or more lifters and is comprised of two wearable harnesses joined by a pair of support straps which are preferably cross linked so as to comprise an X-shape, with the center of the "X" lying approximately midpoint between the two harnesses. The support straps are fully adjustable and can therefore be adapted to accommodate many sizes and shapes of objects. This harness system allows loads to be carried while the user's hands are completely free to maneuver the load or attend to other tasks. Upon lifting, the harness and straps cause the load to be angled away from the body, thereby making it less likely that a dropped load will injure a wearer.

This invention will be more fully understood through the following objects and advantages:

It is an object of this invention to provide a harness system which allows unusually large or bulky loads to be lifted and carried with minimal strain to a lifter.

It is another object of this invention to provide a harness system which takes advantage of two or more lifters.

Still another object of this invention is to provide a harness system which allows a lifter's hands to be free during lifting.

Another object of this invention is to provide a harness system which naturally, directs a load away from a lifter's body so as to reduce the chances of injury should a heavy load be unintentionally dropped.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENT

Figure 1:
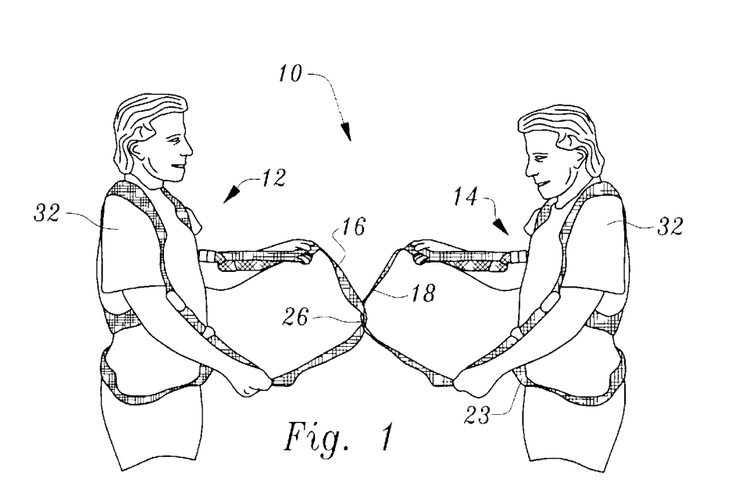
FIG. 1 is a side perspective view of the harness system of the present invention shown being worn by two wearers.
Figure 2:
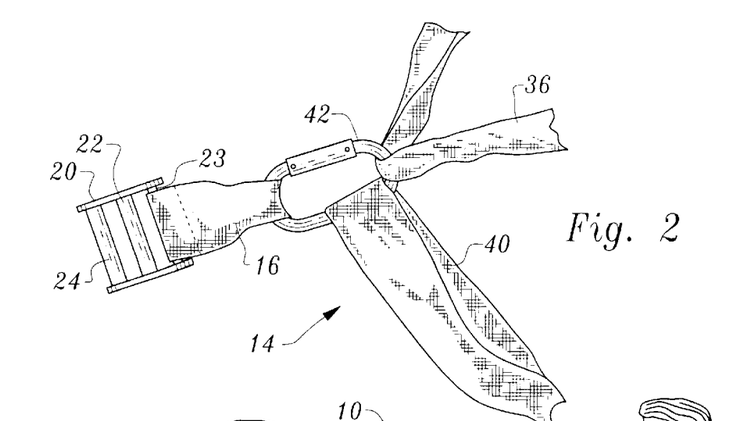
FIG. 2 is a closeup view of a slide buckle used on the support straps of the harness system, this view showing one wearer of the harness system.

Referring more specifically to the drawings, the present invention in the embodied in the harness system 10 shown generally in FIG. 1. This harness system is comprised of two harnesses 12, 14 joined by two support straps 16, 18 which are used as a load bearing surface for lifting large bulky loads. Additionally, at least one of the support straps 16, 18 are adjustable, this adjustability being accomplished by use of a slide buckle 20 in the preferred embodiment as shown in FIG. 2. The fuction of the slide buckle 20 with the straps 16, 18 is similar to that of the floating bar buckle 70 and strap lengths 71, 73 of FIG. 15. While straps 16, 18 are preferably used, other lines such as ropes, cables or belts of planar or cylindrical construction could be utilized.

Slide buckle 20 has the advantage of allowing a support strap to be adjusted in length, while preventing support strap from slipping loose upon bearing a heavy load. The slide buckle 20 can have a variety of different configurations, but preferably includes an upper movable gripping member 22 and a lower stationary gripping member 24 which keeps support strap 16, 18 from slipping. At least one harness 12, 14 is coupled to an adjustable support strap 16, 18, which adjustable strap has considerable unused strap 23 which can be played out according to the size of the load being acommodated. Harness and support straps are contructed from any durable, resilient material which can bear heavy loads. The straps preferably feature high flexibility and low elasticity, as well as high tensile strength. In the preferred embodiment, ballistic nylon has proven to be a type of material which meets the requirements of the invention.

Figure 3:
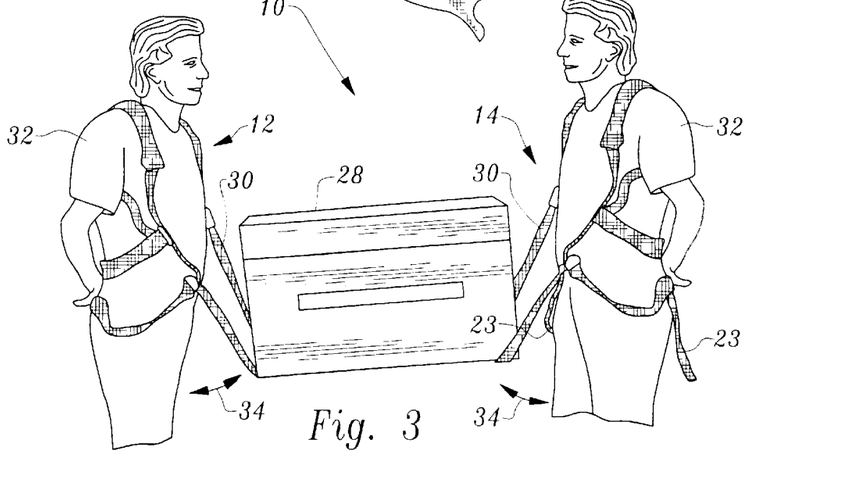
FIG. 3 is a side view of the harness system being worn by two wearers and being used to lift a large object.

FIG. 1 illustrates a preferred arrangement of support straps 16, 18 as being interlinked between the two harnesses 12, 14, forming "X" shape. This "X" shape has been found to provide a stable load bearing surface at the center point 26 where support straps meet, and should be placed beneath an object 28 being lifted at its center of gravity. If center point 26 is placed at the center of gravity of an object, then the arms 30 of support straps wrap underneath and around an object 28 being lifted, as shown in FIG. 3. In this way, the object 28 is fully supported on the support straps 16, 18 and the correstponding harnesses 12, 14. As shown in FIG. 3, the wearers hads are free to maneuver the object 28 being cattied, or else attend to other tasks.

In the preferred embodiment two object 28 lifting line paths are provided between the two harnesses 12, 14. Each strap 16, 18 only fills part of each object 28 lifting line path. Other alternatives, while less desirable overall, may be used effectively in many circumstances. For instance, each strap 16, 18 or other line could extend from the first harness 12 to the second harness 14, with or without crossing of a link. More than two lines and two harnesses could also be used, or a single line between the two harnesses.

Also as shown in FIG. 3, upon lifting an object, the arms 30 of support straps 16, 18 naturally angle object 28 away from the wearers' bodies 32 such that ample space 34 is afforded for leg movement and safety, should the object be dropped, thereby reducing the change of injury to the wearers. Additionally, upon lifting, the arms 30 of support straps 16, 18 become taught, and therefore, object 28 remains relatively still and does not move considerably, thereby contributing to the stable quality of this harness system 10.

If exceptionally large objects are being lifted, such as pianos or book cases, it is preferably for both harnesses 12, 14 to be coupled to an adjustable support strap 16, 18. In this manner, both wearers can play out enough strap thtough slide buckles 20 such that a large load can be accommodated.

Figure 4:
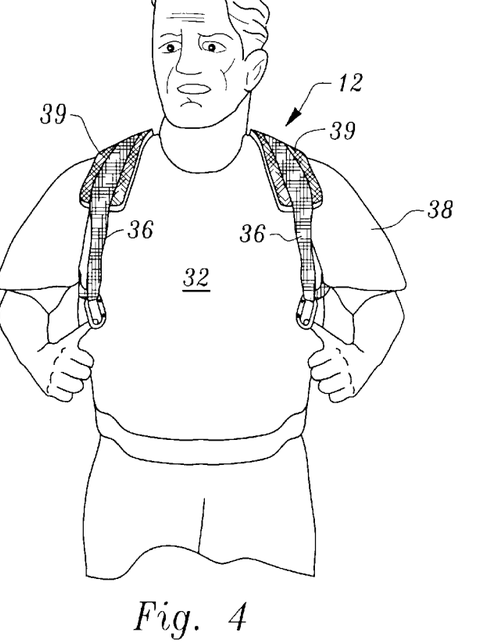
FIG. 4 is a front view of the harness system being worn by a wearer.
Figure 5:
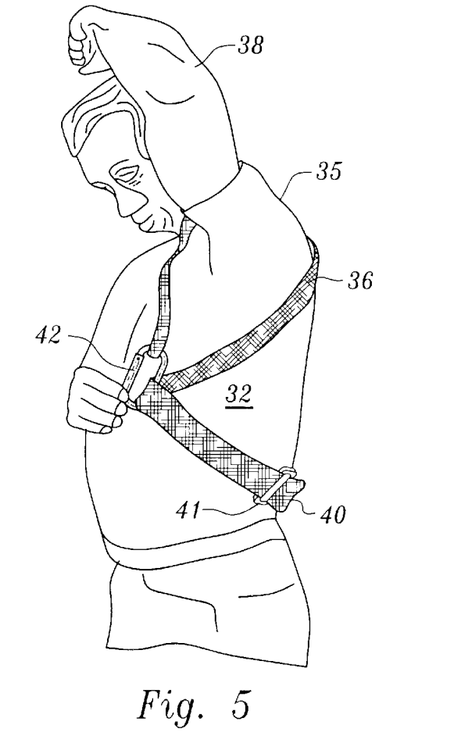
FIG. 5 is a side view of a harness component of the harness system being worn by a wearer.
Figure 6:
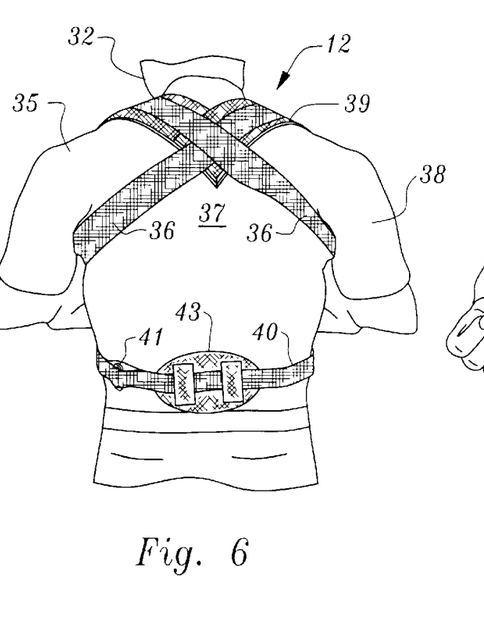
FIG. 6 is a rear view of a harness being worn by a wearer.

FIGS. 4–6 illuatrate the respective front, side, and rear views of a hrness 12, shown being worn by a wearer 32. The harness 14 is similar and so its detailed description is omitted. As shown, harness 12 is comprised of shoulder straps 36 which drape over the shoulders 35 and cross over the back 37 to finally loop under the arms 38. The basic harness 12 has a double loop or "figure 8" configuration with the cross-over point between the shoulder blades of the wearer 32. The crossover point can have the straps 36 attached to each other or free floating. As shown, shoulder straps 36 can be modified to include padding 39 for reducing weight borne stress upon the top portions of a wearer's shoulders.

Figure 7:
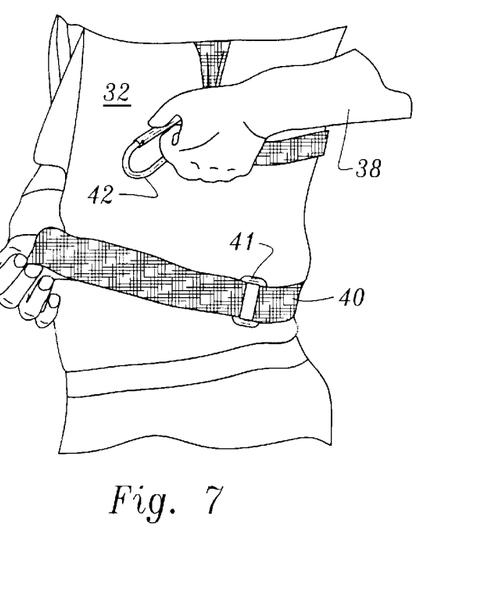
FIG. 7 is a closeup side view showing the attachment of a back support to a harness being worn by a wearer.
Figure 8:
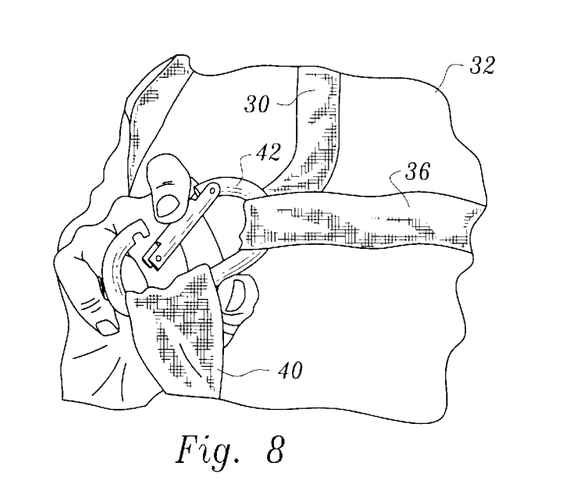
FIG. 8 is a closeup side view of a fastener used for fastening the support strap and back support components of the harness system.

A lower back support 40 can be included as shown in FIGS. 5, 6 and 7. This lower back support 40 is preferably removable and has a slide buckle 41 for adjustability as shown in FIG. 7. The support 40 preferably includes a back pad 43 (FIG. 6) centrally located thereon. The back pad 43 can be centered to enhance wearer 32 posture or merely provide a pad to spread out loads from the support 40.

Support straps 16, 18 and back support 40 couple to the straps 36 of the harness 12 using a fastener 42, preferably as shown in FIGS 2, 5, 7 and 8, which allows the support straps 16, 18 and back support 40 to be removed. In the preferred embodiment a carabiner operates as a removable fastener 42 which meets the requirements of the invention.

Figure 9:
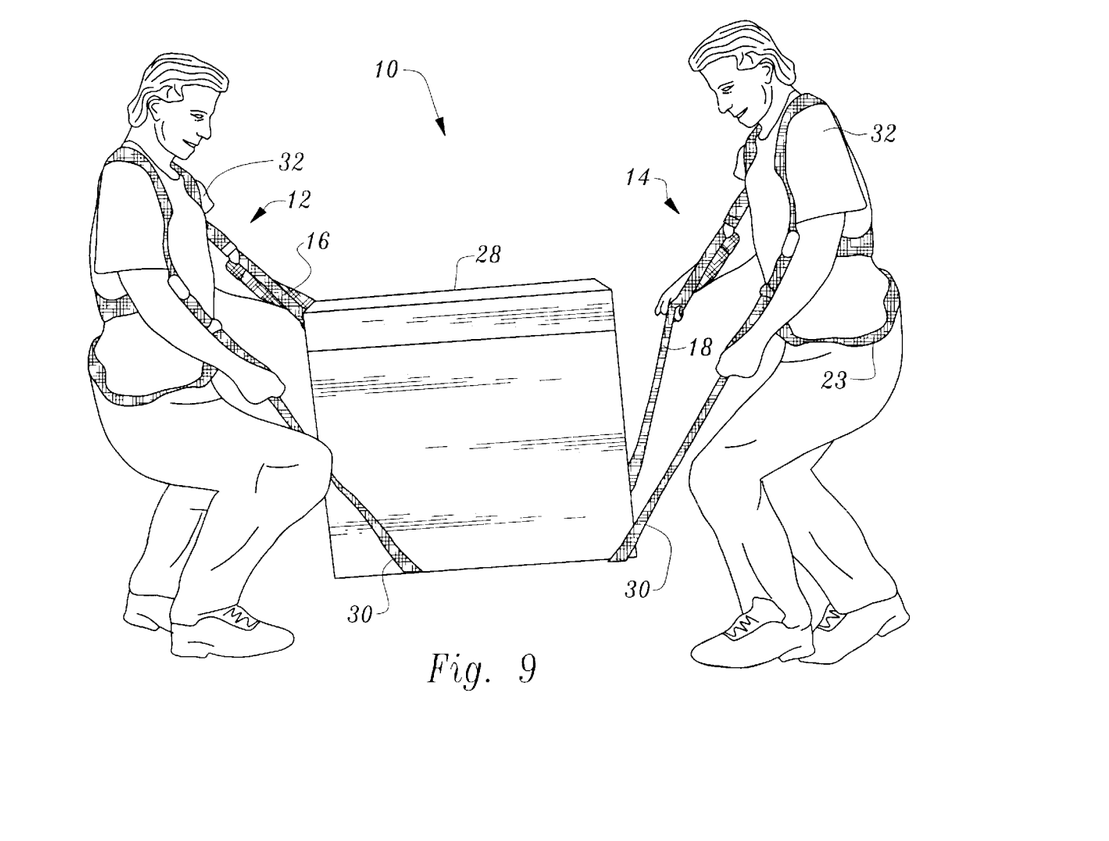
FIG. 9 is a side view of two wearers properly positioning themselves in preparation for lifting a large object.
Figures 10, 11, 12:
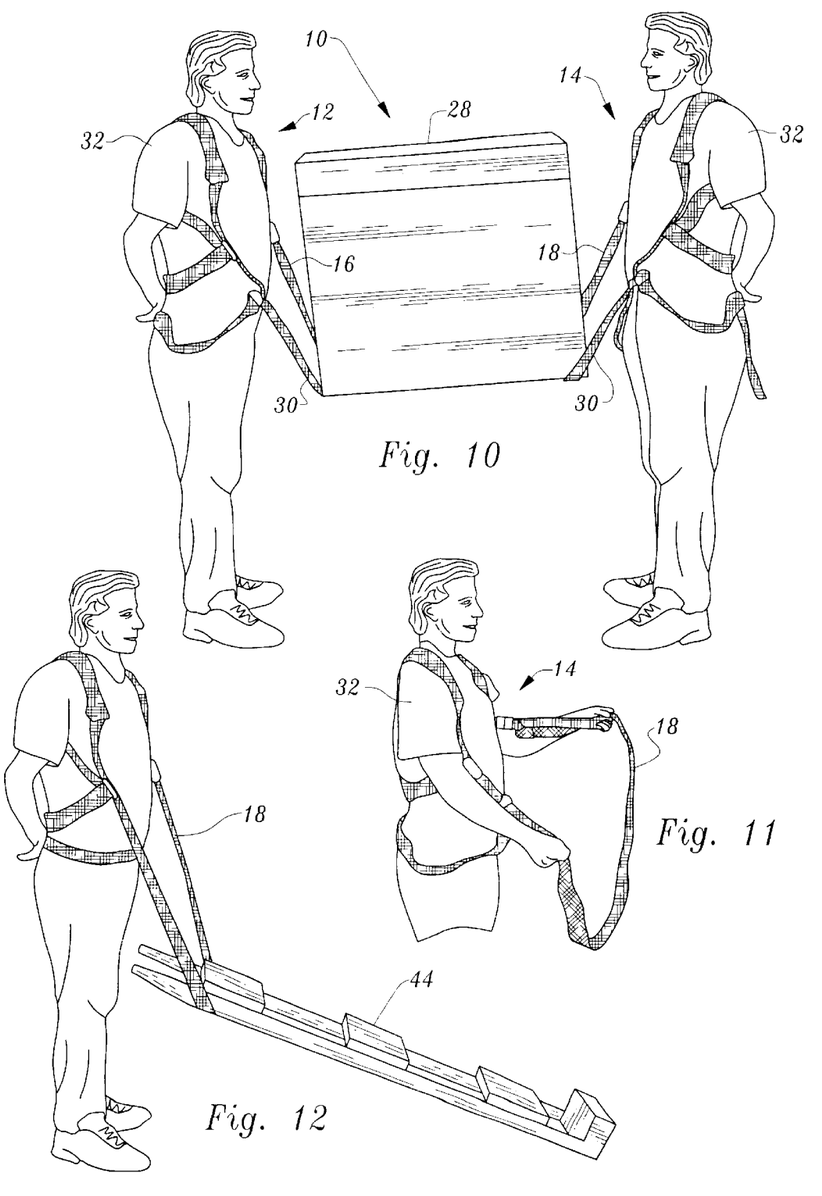
FIG. 10 is a side view of the wearers shown in FIG. 9 having lifted the large object and preparing to carry it to a new location using the harness system of the present invention.
FIG. 11 is a side view of the harness system worn by a single wearer.
FIG. 12 is a perspective view of the harness system being worn by a single wearer and attached to a skid board.

The adjustable quality of support straps 16, 18 allows this harness system 10 to lift heavy and bulky objects 28 with a minimum of bending or stooping. For this reason, it is believed that harness system 10 reduces many of the injuries associated with lifting large objects 28 by normal means. As shown in FIGS. 9 and 10, two wearers 32 are shown adjusting support straps 16, 18 prior to lifting a large piece of furniture 28. Prior to lifting an object 28, the proper positioning for using harness system 10 is to be in a slight squatting position, with knees bent. Upon adusting support straps 16, 18 so that center point 26 coincides with the center of gravity of the object, support straps 16, 18 are adjusted so that all slack is taken out. The two wearers then rise from a "knees bent" position to a full standing position, and in doing so, the large object 28 is lifted free of the ground. To help stabilize the load, the arms 30 of the straps 16, 18 can pass around the lateral sides of the object 28 or near corners of the object 28.

FIGS. 11 and 12 illustrate a single user appliation of the harness system. Adjustable support straps 16, 18 can be used as a towing system for large objects. A common method for moving large objects used by house movers is to use a skid board 44. In such a situation, the harness system used with two wearers might not be practical, as a large object might need to be maneuvered through a space big enough for one wearer. In such a situation, the support strap serves as a load bearing surface and one wearer could easily tow a skid board loaded with large objects such as a grand piano.

Figures 13, 14, 15, 16:
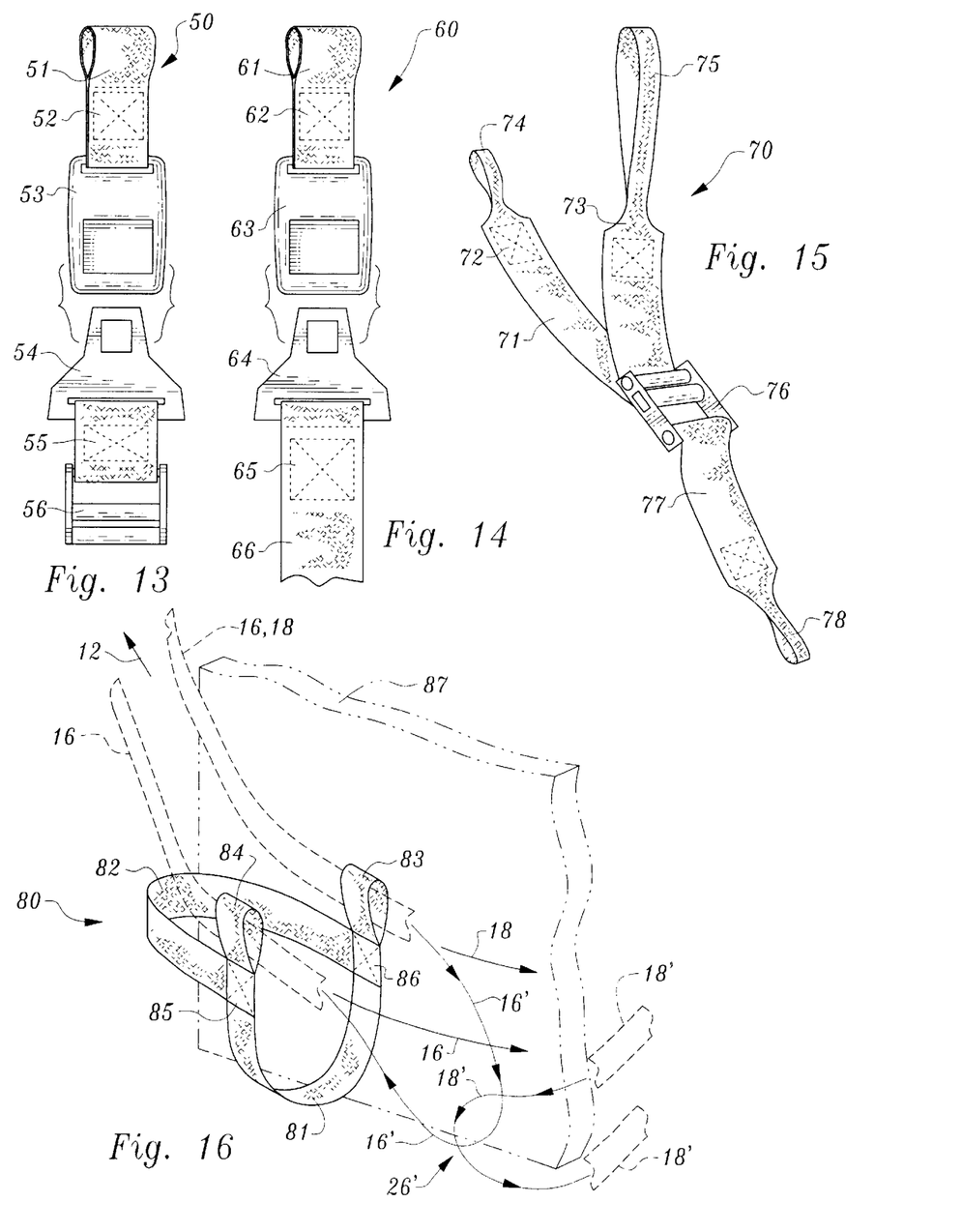
FIG. 13 is a top plan view of a quick release accessory interposable between a harness of this invention and straps of this invention.
FIG. 14 is a top plan view of a second quick release for attachment to an opposite end of the support strap and the harness so that both ends of the support strap can be quickly released from the harness.
FIG. 15 is a perspective view of a quick clip accessory interposable between a harness of this invention and other structures to be carried and which features quick length adjustability.
FIG. 16 is a perspective view of a vertical sling accessory of this invention which is configured to have support straps of this invention threaded through loops of the vertical sling so that large planar objects can be easily carried with the system of this invention.

With particulat reference to FIGS. 13 and 14, details of a quick release 50 to disconnect the support straps 16, 18 from the harness 12, 14 is described. The quick release accessory 50 includes a fixed loop 51 which connects to the carabiner or other fastener 42 (FIGS. 5 and 8) for attachment to one side of the harness 12, 14. A standard "box X" seam 52 secures the fixed loop 51 in position. A seat belt style clip 54 can be removably coupled to a buckle 53 affixed to the fixed loop 51. The buckle 53 includes a button which can be quickly and easily depressed to separate the clip 54 from the budkle 53. The clip 54 includes strap material 55 connected to a folating var buckle 56.

The floating bar buckle 56 allows for adjustment of a length of the support strap 66 (FIG. 14) extending between the two fasteners 42 on the harness 12, 14. The strap 66 is thus analogous to the support straps 16,18 of the system 10 (FIG. 1). A second assembly 60 is provided with a construction similar to the quick release 50, but adapted for the second carabiner or other fastener 42 on the harness. The second assebmly 60 thus includes a fixed loop 61 coupled by a length of strap 12, 14 material 62 to a buckle 63. A clip 64 is removably attachable to the buckle 63. The "box X" seam 65 attaches a length of the strap 66 to the clip 64. This length of strap material 66 extends away from the assembly 60 around to the floating bar buckle 56 of the quick release 50. The quick release 50, 60 thus both provides for quick detachment of the strap 66 away from the harness at both ends of the strap, and also provides for lenght adjustability of the strap extending between the two buckles 53, 63 of the quick release system 50, 60.

With particular reference to FIG. 15, a quick clip accessory 70 is described which can be interposed between the carabiner or other fastener 42 on each harness 12, 14 and the strap 16, 18. The quick clips 70 facilitate quick adjustability of a length of the strap 16, 18 or other lifting structure. The quick clip 70 is preferably constructed of strap-like material 71 with the carabiner or other fastener 42 attached to the fixed loop 74, connecting the quick clip accessory 70 to the harness 12, 14.

The strap 71 is looped through the floating bar buckle 76 and a fixed loop handle 75 is provided on an end of the strap 71 which is accessible for the user to adjust the length of the strap by pulling upward on the strap length 73 closest to the loop handle 75. On the opposite end of the floating bar buckle 76, and additional strap 77 is provided which extends out to an additional fixed loop 78. A second carabiner or other connector can then go directly to an item such as a fire and rescue stretcher, or other support structure to be located beneath an object to be lifted. "Box X"0 seams 72 can be used to secure the fixed loops 74, 75, 78 to other strap portions 71, 73, 77 of the quick clip accessory 70.

The quick clip accessory 70 would typically be worn in pairs with one on either side of the harness 12, 14. The user would adjust the overall lenght of the quick clip 70 by pulling upward on the strap lenght 73 via the fixed loop handle 75. When a length of the quick clip accessory 70 is to be increased, the strap length 73 would be fed back down through the floating bar buckle 76 to feed the strap length 73 back through the floating bar buckle 76.

With particular reference to FIG. 16, deails of a vertical sling accessory 80 of this invention is described. The vertical sling 80 attaches to other portions of the system 10 of this invention and allows users to support thin square items such as doors, glass, mirrors, plywood, sheet rock, etc. The veritcal sling 80 cradles a "square" corner of the object 87 giving support at the bottom and side edge of the object 87 being carried. The cross strap 16, 18 of this invention could additionally provide lateral and/or underneath support for the object 87.

The vertical sling 80 is formed of strap-like material including a vertically oriented U-shaped sling 81. A rear support strap 82 extends horizontally from the U-shaped sling 81. The cross straps of this invention are fed through fixed loops 83, 84 at the ends of the U-shaped sling 81 located at the top of the vertical sling 80. The fixed loops 83, 84 and the rear support strap 82 can all be secured with two "box X" seams 85, 86.

The cross straps 16 can be routed away from the harness 12 and through the vertical sling 80 in at least two different ways. First, a first strap 16 can pass through one of the fixed loops 83, 84 and then extend over to another side of the ojbect 87 (routing depicted by arrow 16) where it would typically pass through fixed loops in a second vertical sling and then on to a second harness 14 (FIG. 1). In such an arrangement a second strap 18 would be similarly oriented through the other fixed loop 84, 83 and then extend on to a second vertical sling and to the opposite harness 14 (routing depicted by arrow 18).

In an alternative arrangement, depicted with prime reference numerals, a first support strap 16 is coupled at each end ot the first harness 12 so that the routing of the first strap 16 follows along line 16'. A second strap 18' would link with the first strap 16' at a link 26' which would typically be underneath the object 87 to be carried. The second strap 18' would be routed back to the second harness 14. Typically, a second vertical sling would be coupled to the second support strap 18' at a side edge of the object 87 being carried.

Figure 17:
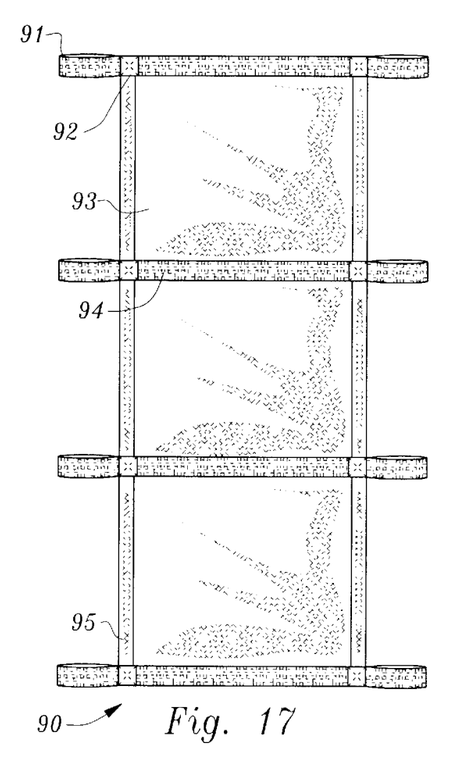
FIG. 17 is a bottom plan view of a carryall accessory of this invention including loops configured to receive straps of this invention.
Figure 18:
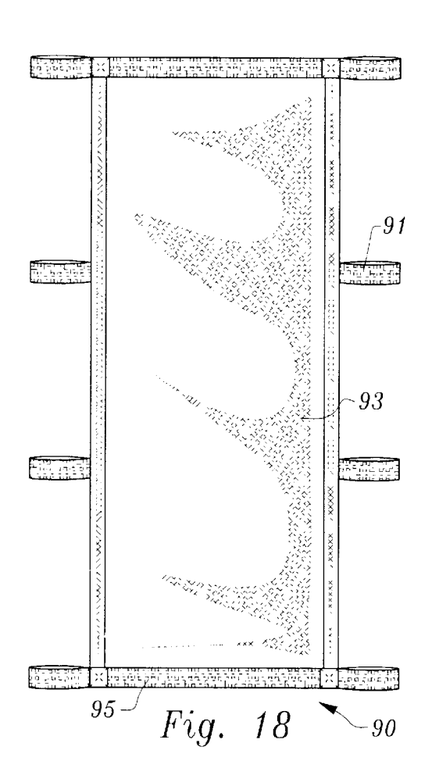
FIG. 18 is a top plan view of that which is shown in FIG. 17.
Figure 19:
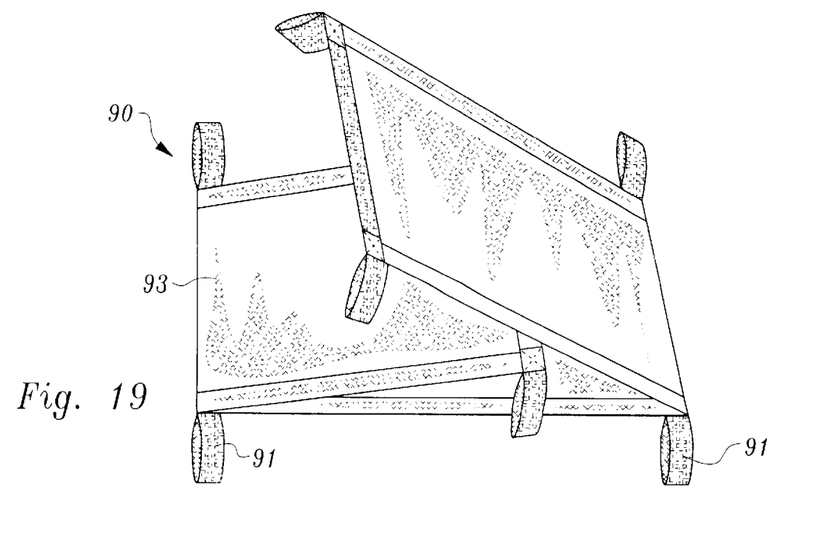
FIG. 19 is a perspective view of that which is shown in FIG. 17 illustrating how the carryall accessory can be folded to shorten its length for use with smaller items.

With particular reference to FIGS. 17–19 a carryall accessory 90 is described for use with the system 10 of this invention. The carryall accessory 90 includes a series of flexible high tensile strength webbing 95 surrounding a perimeter of the carryall structure 90 and with support webbing 94 spanning intermediate portions of the carryall 90. A fabric 93, such as quilted padding, fills portions of the carryall 90 inboard of the perimeter webbing 95. Loop handles 91 are located at each corner of the carryall 90. Additionaly, loops 91 are also provided at intermediate locations between corners of the carryall 90.

A length of the carryall 90 can be adjusted by folding the carryall 90, as depicted in FIG. 19, and use of loops 91 inboard of the corners. The carryall 90 allows large fragile planar items to be easily carried, such as glass, mirrors, windows, table tops and the like. In addition, the carryall 90 is effective in supporting mattresses and other less rigid items. The cross straps 16, 18 (FIG. 1) of this invention are routed through the loops 91 in either a linking fashion where each loop has both of its ends coupled to a common harness 12, 14 or in a spanning fashion where each cross strap 16, 18 extends from one harness 12, 14 to an opposite harness 14, 12.

This disclosure is provided to reveal a preferred embodiment of the invention and a best mode for practicing the invention. Having thus described the invention in this way, it should be apparent that various different modifications can be made to the preferred embodiment without depending from the scope and spirit of this desclosure. When structures are identified as a means to perform a function, the identification is intended to include all structures which can perform the function specified.

What is claimed is:

1. A tandem object lifting apparatus, comprising in combination:

a first harness wearable by a first user, said first harness including a portion which is extendible at least partially across a back side of the first user;

a second harness wearable by a second user, said second harness including a portion which is extendible at least partially across a back side of the second user;

a first line coupled at a first point to said first harness and coupled at a second point to said first harness;

a second line coupled at a first point to said second harness and coupled at a second point to said second harness;

a link between said first line and said second line, said link coupling said first line to said second line, said link located between said first point and said second point on said first line and between said first point and said second point on said second line; and said link including said first line and said second line mutually looped around each other.

2. The lifting apparatus of claim 1 wherein said link is located at a midpoint between said first point and said second point on said first line and at a midpoint between said first point and said second point on said second line.

3. The lifting apparatus of claim 1 wherein said first line is slidably coupled at said first point to said first harness and slidably coupled at said second point to said first harness, such that a length of said first line between said first point and said second point can be adjusted both at said first point and at said second point.

4. The lifting apparatus of claim 3 wherein said slidable attachment of said first point to said first harness remains at a fixed location relative to said first harness.

5. The lifting apparatus of claim 1 wherein said first harness includes at least two loops joined together at at least one location, each said loop sized and spaced to receive one of a user's arms therethrough, each said loop having a line fastener thereon, one of said fasteners located adjacent said first point and one of said fasteners located adjacent said second point; and a back support separate from said at least two loops, said back support extending between said fasteners and coupled to said fasteners.

6. The lifting apparatus of claim 5 wherein said back support includes a slide buckle, said slide buckle adapted to make a length of said back support adjustable.

7. A tandem object lifting apparatus, comprising in combination:

a first harness wearable by a first user, said first harness including a portion which is extendible at least partially across a back side of the first user;

a second harness wearable by a second user, said second harness including a portion which is extendible at least partially across a back side of the second user;

a first line coupled at a first point to said first harness and coupled at a second point to said first harness;

a second line coupled at a first point to said second harness and coupled at a second point to said second harness;

a link between said first line and said second line, said link coupling said first line to said second line, said link located between said first point and said second point on said first line and between said first point and said second point on said second line;

said first harness including at least two loops joined together at at least one location, each said loop sized and spaced to receive one of a user's arms therethrough, each said loop having a line fastener thereon, one of said fasteners located adjacent said first point and one of said fasteners located adjacent said second point; and a back support separate from said at least two loops, said back support extending between said fasteners and coupled to said fasteners.

8. The lifting apparatus of claim 7 wherein said back support includes a slide buckle; said slide buckle adapted to make length of said back support adjustable.

9. The lifting apparatus of claim 8 wherein said back support includes a back pad slidably attached thereto, such that said back pad can remain centered between ends of said back support when a length of said back support is adjusted.

10. The lifting apparatus of claim 9 wherein said link includes said first line and said second line mutually looped around each other.

11. The lifting apparatus of claim 7 wherein said at least two loops of said harness have a fixed size.

\* \* \* \* \*